(12) United States Patent  
Kano

(10) Patent No.: US 9,774,805 B2  
(45) Date of Patent: Sep. 26, 2017

(54) IMAGE PICKUP APPARATUS CHANGING GAIN OF AMPLIFIER OF IMAGE PICKUP DEVICE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Masaaki Kano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 192 days.

(21) Appl. No.: 14/571,757

(22) Filed: Dec. 16, 2014

(65) Prior Publication Data

US 2015/0189202 A1 Jul. 2, 2015

(30) Foreign Application Priority Data

Dec. 27, 2013 (JP) ................................. 2013-272387

(51) Int. Cl.
*H04N 5/351* (2011.01)
*H04N 5/365* (2011.01)
*H04N 5/361* (2011.01)

(52) U.S. Cl.
CPC ........... *H04N 5/361* (2013.01); *H04N 5/3658* (2013.01)

(58) Field of Classification Search
CPC ........................ H04N 5/361; H04N 5/23274
See application file for complete search history.

(56) References Cited

U.S. PATENT DOCUMENTS

| 6,900,837 | B2* | 5/2005 | Muramatsu | H04N 5/374 348/243 |
| 8,547,460 | B2* | 10/2013 | Horiguchi | H04N 5/3454 348/294 |
| 2001/0055068 | A1* | 12/2001 | Funakoshi | H04N 5/372 348/243 |
| 2002/0047934 | A1* | 4/2002 | Nitta | H04N 5/20 348/689 |
| 2004/0046882 | A1* | 3/2004 | Nakano | H04N 5/23248 348/294 |
| 2004/0090558 | A1* | 5/2004 | Takahashi | H04N 5/185 348/691 |

(Continued)

FOREIGN PATENT DOCUMENTS

JP 2009049981 A 3/2009

*Primary Examiner* — Timothy J Henn
(74) *Attorney, Agent, or Firm* — Rossi, Kimms & McDowell LLP

(57) ABSTRACT

An image pickup apparatus capable of obtaining a smooth video image and of reducing deterioration in the vertical resolution and an image stabilization performance. An image pickup device has a valid pixel area for obtaining an image signal, an optical black area for an optical black correction, and an amplifier unit that amplifies an output from the pixel area and outputs an image signal. A gain adjustment unit adjusts gain of the image signal. A reading control unit changes a gain value in the amplifier unit, changes the numbers of lines in the areas, and performs reading control of the image pickup device, when a control gain value in the gain adjustment unit exceeds a reference value. A change unit changes a time constant of a correction filter used for the optical black correction when the control gain value exceeds the specified reference value.

17 Claims, 10 Drawing Sheets

(56) References Cited

U.S. PATENT DOCUMENTS

| | | | | |
|---|---|---|---|---|
| 2004/0239773 | A1* | 12/2004 | Bleau | H04N 5/232 |
| | | | | 348/211.99 |
| 2005/0157214 | A1* | 7/2005 | Takahashi | H04N 5/185 |
| | | | | 348/691 |
| 2007/0115364 | A1* | 5/2007 | Kumaki | H04N 5/23248 |
| | | | | 348/208.99 |
| 2008/0037906 | A1* | 2/2008 | Yano | H04N 9/045 |
| | | | | 382/312 |
| 2009/0109312 | A1* | 4/2009 | Noda | H04N 3/1512 |
| | | | | 348/304 |
| 2009/0180014 | A1* | 7/2009 | Noda | H04N 5/3452 |
| | | | | 348/308 |
| 2012/0293674 | A1* | 11/2012 | Uenaka | H04N 5/23274 |
| | | | | 348/208.99 |
| 2013/0071036 | A1* | 3/2013 | Suzuki | H04N 5/23232 |
| | | | | 382/218 |

\* cited by examiner

IMAGE PICKUP APPARATUS CHANGING GAIN OF AMPLIFIER OF IMAGE PICKUP DEVICE, CONTROL METHOD THEREFOR, AND STORAGE MEDIUM STORING CONTROL PROGRAM THEREFOR

BACKGROUND OF THE INVENTION

Field of the Invention

The present invention relates to an image pickup apparatus that changes gain of an amplifier of an image pickup device, a control method therefore, and a storage medium that stores a control program therefor.

Description of the Related Art

In recent years, an image pickup apparatus, such as a digital still camera or a video camera, is miniaturized, and the number of pixels of an image pickup device like a CMOS image sensor thereof increases, which makes a cell (pixel) size be fine. Then, the finer the cell size is, the lower the sensitivity of an image pickup device is unescapably. Furthermore, high frame rate is set for shooting a video image in an image pickup apparatus in order to obtain a smooth video image. For example, a video image is obtained by controlling reading of signals from an image pickup device at the frame rate of 60 frames per second.

Accordingly, if a video image is taken in low illuminance, drop of an S/N ratio due to the degradation of the sensitivity of an image pickup device will deteriorate image quality as a result.

In order to avoid such a fault, there is a known image pickup apparatus that reduces the total noise amount by changing a control gain value of a gain amplifier (AMP) for each column according to illuminance of a subject (see Japanese Laid-Open Patent Publication (Kokai) No. 2009-49981 (JP 2009-49981A)).

Incidentally, offset levels of the gain amplifiers of the respective columns with which the image pickup device is provided are different with one another. Accordingly, the image pickup apparatus described in the above-mentioned publication may cause what is called a longitudinal line flaw or a black level deviation in images of several fields through several tens of fields immediately after the change of the control gain values due to the difference among the offset levels of the gain amplifiers of the respective columns. Then, the longitudinal line flaw and the black level deviation deteriorate the image quality.

In order to cope with the difference among the offset levels, there is a known technique that enlarges a coefficient (time constant) of a correction filter, which is used in a vertical optical black (VOB) correction process for subtracting a projection output of a VOB area from an output of an effective area, immediately after changing the control gain values of the gain amplifiers of the respective columns. Then, this technique minimizes the black level deviation and the longitudinal line flaw at the time of changing the driving mode of the image pickup device by enlarging the coefficient of the correction filter to shorten filter convergence time.

Incidentally, since the convergence time of the correction filter is inversely proportional to the number of lines in the vertical optical black (VOB) area with which the image pickup device is provided, it needs to increase the number of lines in the VOB area read from the image pickup device as many as possible.

On the other hand, in order to obtain a smooth image in the case of taking a video image, it is necessary to output the video signal at the frame rate of 60 frames per second as mentioned above. As a result of this, the reading time for one frame is determined (16.67 msec per frame).

Furthermore, the number of lines read from the image pickup device is the total of the number of the reading lines in the VOB area and the number of the reading lines in the valid pixel area that is used for a video signal and electronic image stabilization. In order to output the video signal of one frame at a specified frame rate, it is necessary to restrict the number of lines through which the signals are read from the image pickup device. Accordingly, if the number of the reading lines in the VOB area increases, the number of the reading lines in the valid pixel area used for the video signal and the electronic image stabilization will decrease relatively.

Reduction of the number of lines used for the video signal in this way will degrade vertical resolution. Furthermore, when a surplus effective pixel area that is defined by excepting the video signal area from the valid pixel area decreases, an image stabilization area in which a segmenting position varies will be narrow, which deteriorates an image stabilization performance.

SUMMARY OF THE INVENTION

The present invention provides an image pickup apparatus, a control method therefor, and a storage medium storing a control program therefor, which are capable of obtaining a smooth video image and of reducing deterioration in the vertical resolution and an image stabilization performance.

Accordingly, a first aspect of the present invention provides an image pickup apparatus comprising an image pickup device configured to have a pixel area including a valid pixel area for obtaining an image signal and an optical black area for an optical black correction and an amplifier unit that amplifies an output from the pixel area concerned, and to output an image signal corresponding to an optical image formed in the valid pixel area, a gain adjustment unit configured to adjust gain of the image signal and to make a gain adjusted image signal, an image processing unit configured to apply a specified image process to the gain adjusted image signal and to obtain image data, a reading control unit configured to change a gain value in the amplifier unit, to change the numbers of lines in the valid pixel area and the optical black area in the pixel area, and to perform reading control of the image pickup device, when a control gain value in the gain adjustment unit exceeds a specified reference value at the time of reading the image signal from the image pickup device, and a change unit configured to change a time constant of a correction filter that is provided in the image processing unit and is used in the optical black correction when the control gain value in the gain adjustment unit exceeds the specified reference value.

Accordingly, a second aspect of the present invention provides a control method for an image pickup apparatus having an image pickup device that has a pixel area including a valid pixel area for obtaining an image signal and an optical black area for an optical black correction and an amplifier unit that amplifies an output from the pixel area concerned, and that outputs an image signal corresponding to an optical image formed in the valid pixel area, a gain adjustment unit that adjusts gain of the image signal and makes a gain adjusted image signal, and an image processing unit that applies a specified image process to the gain adjusted image signal and obtains image data, the control method comprising a reading control step of changing a gain value in the amplifier unit, of changing the numbers of lines in the valid pixel area and the optical black area in the pixel area, and of performing reading control of the image pickup device, when a control gain value in the gain adjustment unit exceeds a specified reference value at the time of reading the image signal from the image pickup device, and a change step of changing a time constant of a correction filter that is provided in the image processing unit and is used in the optical black correction when the control gain value in the gain adjustment unit exceeds the specified reference value.

Accordingly, a third aspect of the present invention provides a non-transitory computer-readable storage medium storing a control program causing a computer to execute the control method of the second aspect.

According to the present invention, a smooth video image is obtained, and deterioration of vertical resolution and image stabilization performance is reduced.

Further features of the present invention will become apparent from the following description of exemplary embodiments with reference to the attached drawings.

DESCRIPTION OF THE EMBODIMENTS

Hereafter, an example of an image pickup apparatus that is provided with a reading control apparatus according to an embodiment of the present invention will be described with reference to the attached drawings.

Figure 1:
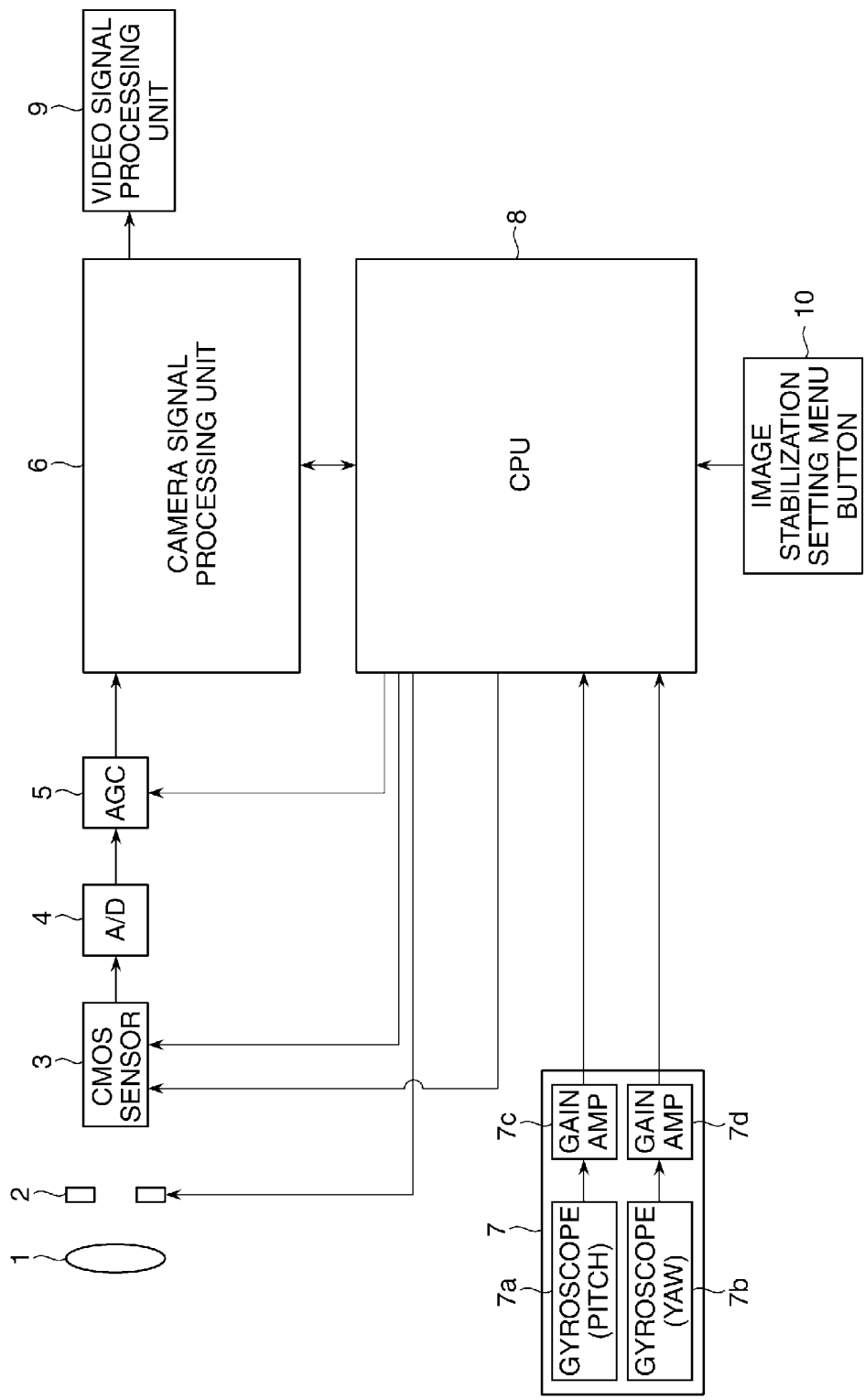
FIG. 1 is a block diagram schematically showing a configuration of an image pickup apparatus according to a first embodiment of the present invention.

FIG. 1 is a block diagram schematically showing a configuration of an image pickup apparatus according to a first embodiment of the present invention.

The illustrated image pickup apparatus is a digital camera (referred to as a camera, hereafter) that has a video taking function. The camera has a taking lens unit that is provided with a taking lens (referred to as a lens, hereafter) 1 and a diaphragm 2 at least.

A light passed through the lens 1 and the diaphragm 2 forms an optical image on a CMOS image sensor (referred to as a CMOS sensor, hereafter) 3, which is one of image pickup devices. Then, the CMOS sensor 3 outputs an electrical signal (an analog image signal) corresponding to the optical image.

A plurality of pixels are arranged on the CMOS sensor 3 at a two-dimensional matrix form. Then, the CMOS sensor 3 is provided with a pixel area that consists of a valid pixel area for obtaining an analog picture signal and a vertical optical black area (VOB area) for a vertical optical black (VOB) correction. Furthermore, the CMOS sensor 3 has gain amplifiers (amplifier units) that amplify the outputs of respective column in the pixel area.

The above-mentioned analog image signal is converted into a digital image signal by an A/D converter 4. Then, this digital image signal is given to a camera signal processing unit 6 through an automatic gain control unit (AGC) 5 for an exposure control.

The AGC 5 amplifies the digital image signal using a control gain value set by a CPU 8, and obtains a gain adjusted image signal. For example, the digital image signal is given to the camera signal processing unit 6 as continuous RAW data at the frame rate of 60 frames per second (60 f/s).

Figure 2:
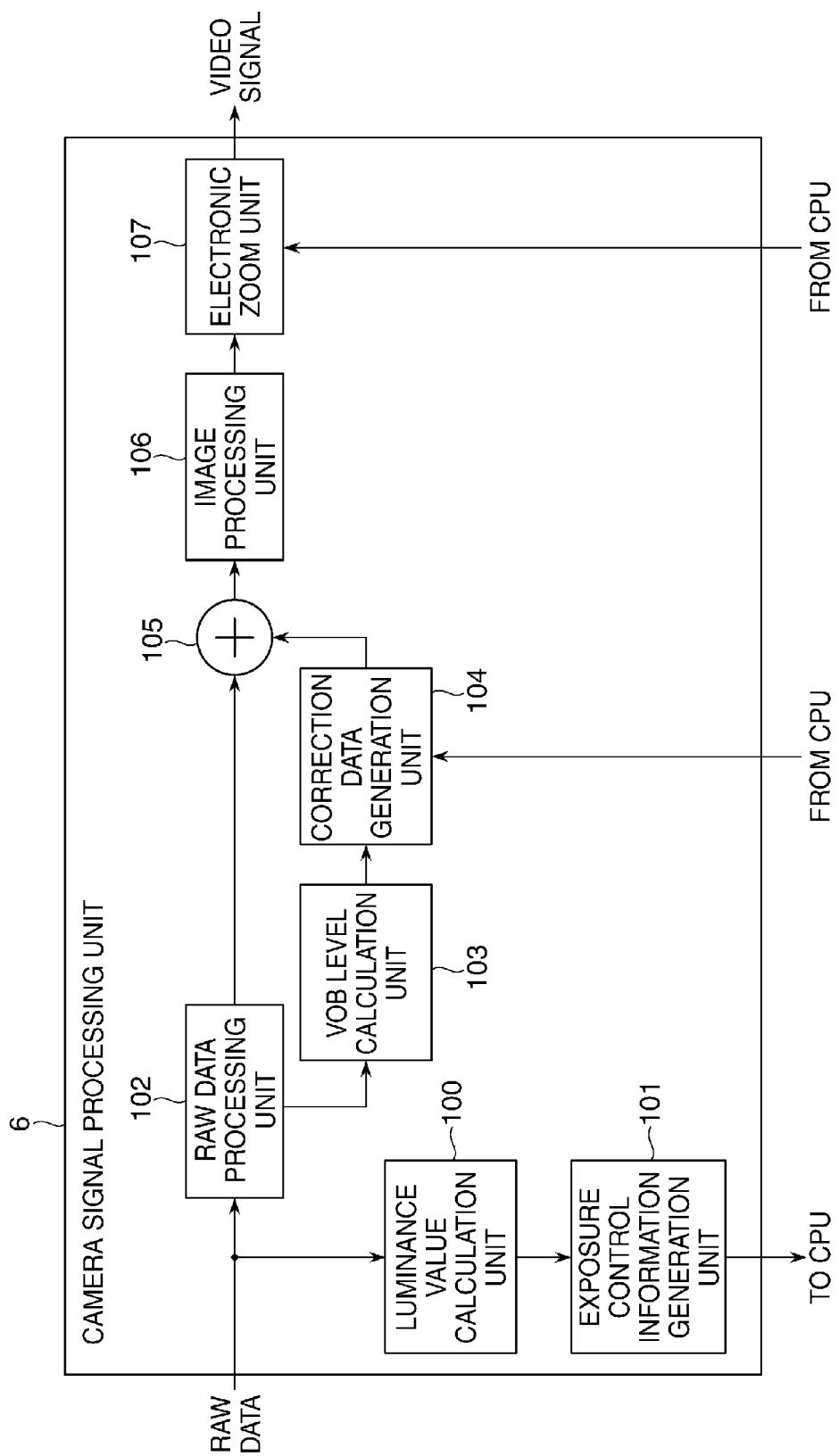
FIG. 2 is a block diagram schematically showing a configuration of a camera signal processing unit shown in FIG. 1.

FIG. 2 is a block diagram schematically showing a configuration of the camera signal processing unit 6 shown in FIG. 1.

The camera signal processing unit 6 has a luminance value calculation unit 100, an exposure control information generation unit 101, a RAW data processing unit 102, a VOB level calculation unit 103, a correction data generation unit 104, an adder 105, an image processing unit 106, and an electronic zoom unit 107. The above-mentioned RAW data is given to the luminance value calculation unit 100 and the RAW data processing unit 102 in the camera signal processing unit 6. Then, the luminance value calculation unit 100 calculates a luminance level (a brightness value) for performing exposure correction according to the RAW data, and outputs a luminance level signal that shows the luminance level.

The luminance level signal concerned is inputted into the exposure control information generation unit 101, and the exposure control information generation unit 101 determines whether the current exposure state is proper on the basis of the luminance level inputted. Then, the exposure control information generation unit 101 outputs the exposure control information for performing exposure control according to the determination result concerned to the CPU 8.

Receiving the RAW data continuously, above-mentioned RAW data processing unit 102 buffers the RAW data for at least one frame. The RAW data buffered by the RAW data processing unit 102 is given to the adder 105 and is sent to the VOB level calculation unit 103.

The VOB level calculation unit 103 calculates levels of lines corresponding to a vertical optical black (VOB) area (also referred to as an optical black area) of the CMOS sensor 3 according to the RAW data, and outputs a VOB level signal that shows a VOB level to the correction data generation unit 104.

The correction data generation unit 104 calculates variation correction data for correcting a characteristics variation among gain AMPs (amplifier units) provided for the respective columns of the CMOS sensor 3 according to the VOB level signal. Then, the correction data generation unit 104 inverts the sign of the variation correction data concerned, and outputs it to the adder 105 (this correction data is referred to as inversion correction data, hereafter).

The adder 105 adds the RAW data given from RAW data processing unit 102 and the inversion correction data, and outputs it to the image processing unit 106 as addition RAW data. The image processing unit 106 applies a predetermined image process suitable for a video image and a color process to the addition RAW data, and outputs it to the electronic zoom unit 107 as processed image data.

The electronic zoom unit 107 performs segmentation position control for performing a below-mentioned electronic image stabilization function with respect to the processed image data, and outputs it to the video signal processing unit 9 as a video signal. The video signal processing unit 9 applies a display process for displaying on a display unit like a television to the video signal.

As shown in FIG. 1, the camera is provided with a gyroscope unit 7 that has first and second gyroscopes 7a and 7b for detecting a camera-shake occurred while taking a subject. Then, the first and the second gyroscope detection signals that are outputted from the first and the second gyroscopes 7a and 7b are amplified by first and second gain AMPs 7c and 7d, respectively, and are inputted into the CPU 8.

It should be noted that the first gyroscope 7a shall detect vibration (shake) in the pitch direction and the second gyroscope 7b shall detect vibration in the yaw direction in the example shown in FIG. 1.

Figure 3:
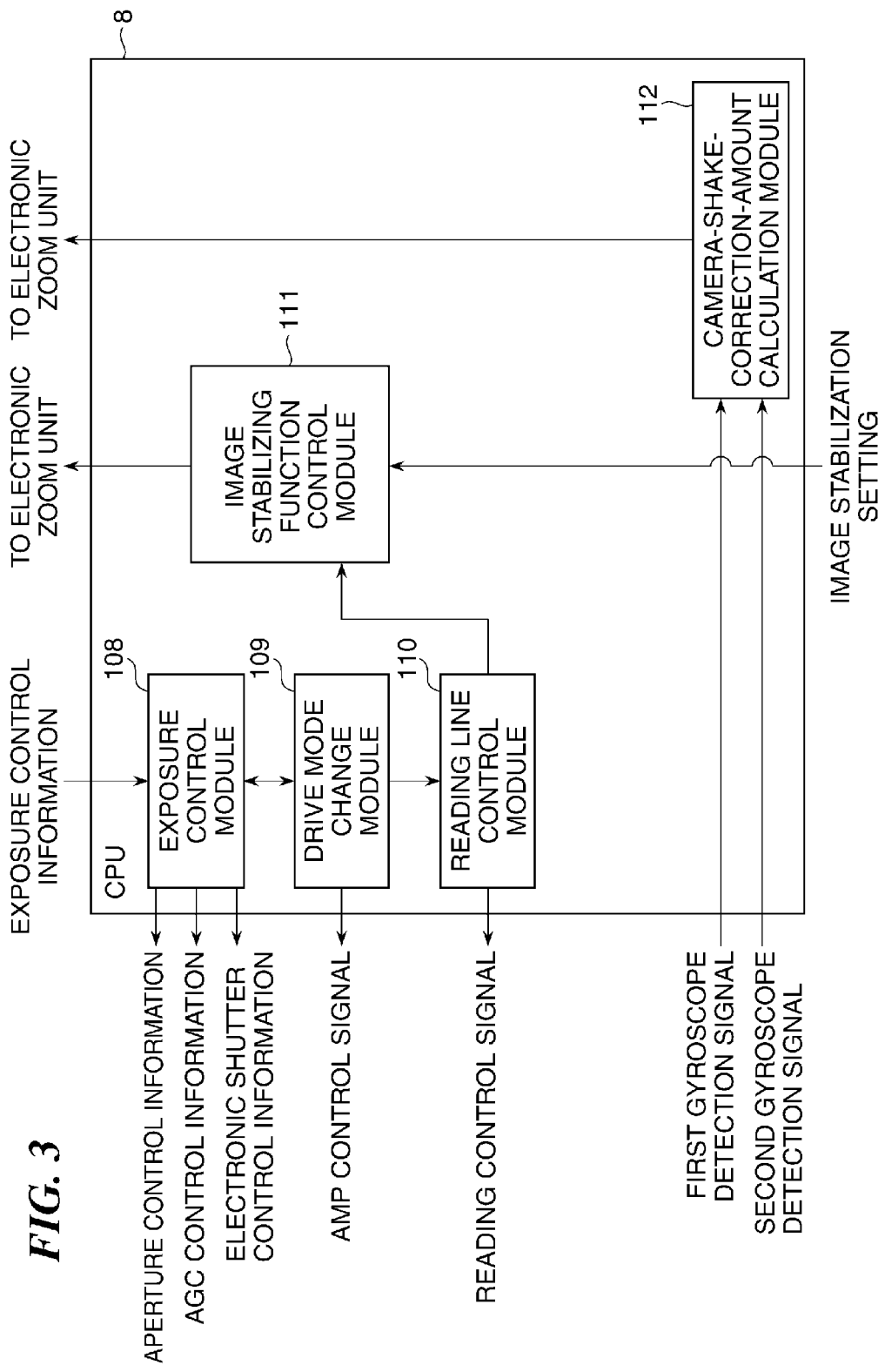
FIG. 3 is a block diagram schematically showing functions of a CPU shown in FIG. 1.

FIG. 3 is a block diagram schematically showing functions of the CPU 8 shown in FIG. 1.

As shown in FIG. 3, the CPU 8 has an exposure control module 108, a drive mode change module 109, a reading line control module 110, an image stabilizing function control module 111, and a camera-shake-correction-amount calculation module 112.

The above-mentioned first and second gyroscope detection signals are inputted into the camera-shake-correction-amount calculation module 112. The camera-shake-correction-amount calculation module 112 calculates a camera shake correction amount according to the first and second gyroscope detection signals, and outputs the camera shake correction information showing the camera shake correction amount to the electronic zoom unit 107. Then, the electronic zoom unit 107 changes the segmenting position at the time of performing a segmentation position control according to the camera shake correction information.

It should be noted that an image stabilization setting menu button 10 for changing ON/OFF of the electronic image stabilization function is connected to the CPU 8 as shown in FIG. 1.

The exposure control information that is outputted from the exposure control information generation unit 101 shown in FIG. 2 is inputted into the exposure control module 108. The exposure control module 108 generates aperture control information, AGC control information, and electronic shutter control information according to the exposure control information. Then, the diaphragm 2, the AGC 5, and the CMOS sensor 3 are controlled according to the aperture control information, the AGC control information, and the electronic shutter control information, respectively. It should be noted that charge storage time of the CMOS sensor 3 is controlled on the basis of the electronic shutter control information.

Relation of a black level deviation that occurs at the time of changing gain AMPs of the respective lines as one of the drive modes of the CMOS sensor 3 with convergence time of the correction filter (an infinite impulse response (IIR) filter (not shown)) with which the correction data generation unit 104 is provided) that performs a VOB correction process (i.e., an optical black correction) will be described.

Figure 4:
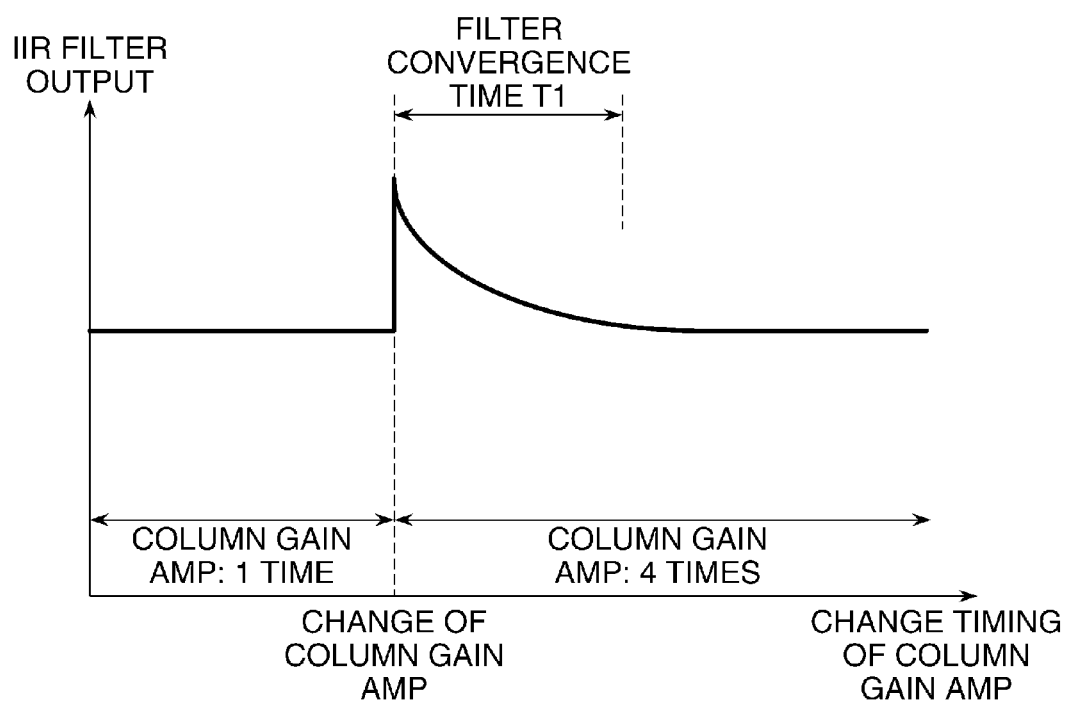
FIG. 4 is a graph showing relation between a black level deviation and convergence time of an IIR filter in a camera shown in FIG. 1.

FIG. 4 is a graph showing the relation between the black level deviation and the convergence time of the IIR filter in the camera shown in FIG. 1.

The IIR filter generates deviation correction data (also referred to as correction data, hereafter) $Y_n$ on the basis of the VOB level $X_n$ and the current variation correction data $Y_{n-1}$ according to the following formula (1).

$$Y_n = KX_n + (1-K)Y_{n-1} \tag{1}$$

Where K is a filter factor, K=1/64, 1/128, 1/256, and . . . .

The output of the IIR filter at the time immediately after changing the gain values of the gain AMPs for the respective columns temporarily becomes larger than a regular state as shown in FIG. 4 due to the difference in offset values of the gain AMPs. Accordingly, if the output of the IIR filter is used as is, a black level deviation or a longitudinal line flaw will occur in the image after the VOB correction.

In order to reduce the black level deviation and the longitudinal line flaw that occur at the time of changing the gain values of the gain AMPs in the respective columns, the filter factor K shown in the formula (1) is increased in the specified several frames after changing the control gain values. That is, the time constant of the IIR filter is increased to shorten the convergence time T1 of the IIR filter.

On the other hand, since the convergence time T1 is inversely proportional to the number of lines in the VOB area, the convergence time T1 in the case where the VOB line number is 20 lines becomes one half of the convergence time T1 in the case where the VOB line number is 10 liens, for example, when the filter factor K is constant. Accordingly, it is preferable to increase the number of VOB lines read from the CMOS sensor 3. However, as mentioned above, since the reading time for one frame is fixed, it is difficult to increase the number of VOB lines to read when more than a certain number of lines in a valid pixel area are read.

Figure 5:
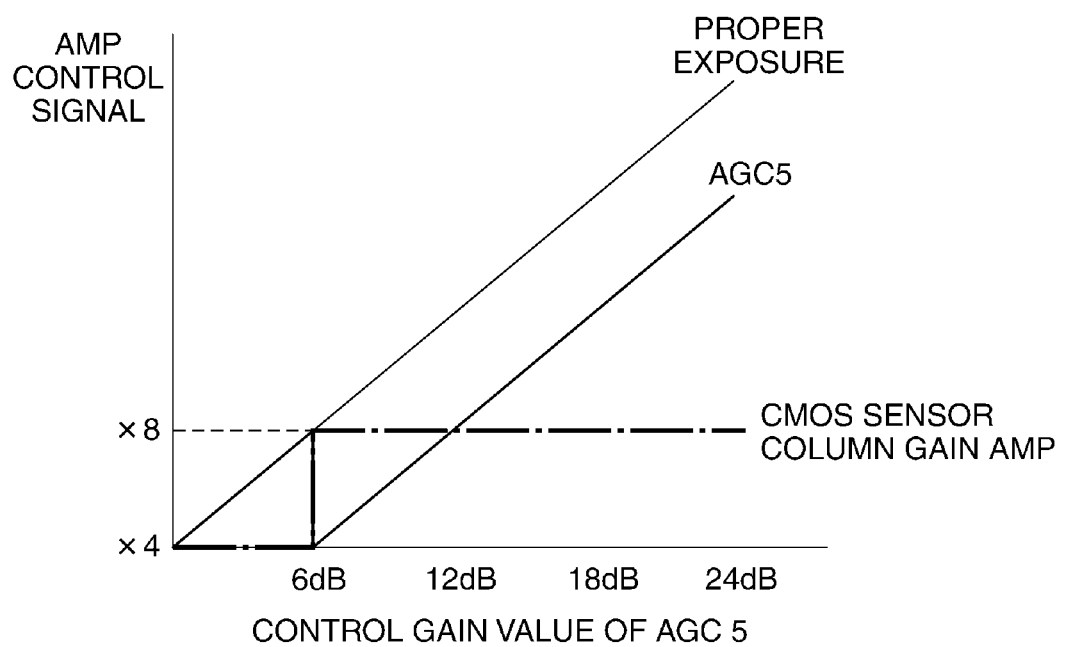
FIG. 5 is a graph showing relation among a control gain value of an AGC, a gain value of a column gain amplifier of a CMOS sensor, and a gain value of the AGC that are included in the camera shown in FIG. 1.

FIG. 5 is a graph showing relation among a control gain value of the AGC, a gain value of a column gain AMP of the CMOS sensor, and a gain value of the AGC that are included in the camera shown in FIG. 1.

First, a change operation of a gain AMP for each column (referred to as a column gain AMP, hereafter) with which the CMOS sensor 3 is provided will be described with reference to FIG. 3 and FIG. 5.

When the control gain value shown by the AGC control information is below a predetermined reference value (for example, 6 dB), the drive mode change module 109 in the CPU 8 shown in FIG. 3 outputs the current AMP control signal (for example, "×4" showing 4 times) for setting the control gain value of the column gain AMP to the CMOS sensor 3 without changing the current AMP control signal as indicated by an alternate long and short dash line in FIG. 5.

On the other hand, when the control gain value shown by the AGC control information exceeds the reference value (6 dB), the drive mode change module 109 outputs the AMP control signal (for example, "×8" showing 8 times) for increasing the control gain value of the column gain AMP as compared with the current value to the CMOS sensor 3 as indicated by an alternate long and short dash line in FIG. 5. When the AMP control signal is changed from 4 times to 8 times, the exposure control module 108 outputs the AGC control information showing an AGC gain control value $Z_n$ that is calculated on the basis of the current AGC gain control value $Z_{n-1}$ according to the following formula (2) to the AGC 5.

$$Z_n = Z_{n-1} - 20 \cdot \log_{10}(4/8) \tag{2}$$

The AMP control signal to the AGC 5 is fixed to 4 times when the control gain value of the AGC 5 is 6 dB or less, and increases linearly with the increase in the control gain value according to the above-mentioned formula (2) when the control gain value exceeds 6 dB. It should be noted that a line of proper exposure in the graph shows the AMP control signal to the AGC 5 so as to obtain proper exposure when the AMP control signal of the column gain AMP of the CMOS sensor is not changed. As mentioned above, the control gain value concerning the column gain AMP with which the CMOS sensor 3 is provided is changed according to the exposure control state (i.e., it is the AGC control information). Furthermore, when the column gain AMP control signal is changed from "×4" as 4 times to "×8" as 8 times, the drive mode change module 109 outputs the AMP control signal for setting "×8" to the reading line control module 110.

The reading line control module 110 increases the number of lines used for the VOB correction in the VOB area with which the COMS sensor 3 is provided as compared with the number of liens in the case where the control gain value is "×4", when the AMP control signal of the column gain AMP is changed from "×4" to "×8" in response to the AMP control signal. For example, the reading line control module 110 increases the number of lines in the VOB area used for the VOB correction increase from 10 lines to 30 lines by 20 lines.

The increased amount of the number of VOB reading lines in the case where the control gain value is "×8" is beforehand set to the reading line control module 110. That is, the reading line control module 110 increases the number of the VOB reading lines by the predetermined number of lines.

Furthermore, the reading line control module 110 outputs the reading control signal (i.e., the reading line change information) for performing the reading control while decreasing the number of lines in the video signal area and the valid pixel area as the electronic image stabilizable area by the increased amount of the number of VOB lines to the CMOS sensor 3. For example, the number of lines in the valid pixel area is decreased by 20 lines equivalent to the increased amount of the VOB lines.

This does not change the total number of the reading lines in the VOB area and the valid pixel area, even when the control gain value of the column gain AMP with which the CMOS sensor 3 is provided is changed to "×8" from "×4".

The reading line control module 110 outputs the above-mentioned reading line change information to the image stabilizing function control module 111 and the correction data generation unit 104. When an electronic-image-stabilization-function setting (referred to as an image stabilization setting) is set to ON with the image stabilization setting menu button 10, the image stabilizing function control module 111 changes an image stabilizable area in the vertical direction according to the reading line change information (for example, change to 1080 lines from 1100 lines), i.e., according to the changed number of lines in the valid pixel area.

The number of lines in the valid pixel area when the control gain value of the column gain AMP is set at "×4" shall be 1100 lines. In this case, if the control gain value of the column gain AMP is changed to "×8", the number of lines in the valid pixel area will be changed to 1080 lines.

The pixel number required for the video signal outputted from the camera signal processing unit 6 shall be 1920H× 1080V. In this case, since 1080 lines that are the lines in the valid pixel area are used for the video signal, the number of lines in the image stabilizable area in the vertical direction will be zero.

The image stabilizing function control module 111 outputs area change information, which shows the number of liens in the valid pixel area changed and the image stabilizable area changed (i.e., the number of lines), to the camera signal processing unit 6. Then, the electronic zoom unit 107 in the camera signal control unit 6 changes an image stabilizable area according to the area change information, and performs the image stabilization control.

As mentioned above, the image stabilizable area is changed when the control gain value of the column gain AMP is changed to "×8" from "×4". At this time, the correction data generation unit 104 changes (enlarges) the time constant of the correction filter according to the reading line change information. Then, the image stabilizable area is changed during a period when the time constant of the correction filter concerned is changed.

When the time constant of the correction filter is restored to the regular setting, the number of VOB lines used for the VOB correction is restored to regular 10 lines. Furthermore, the reading line control module 110 outputs the reading line change information that sets the image stabilizable area to the regular state to the image stabilizing function control module 111.

Figure 6:
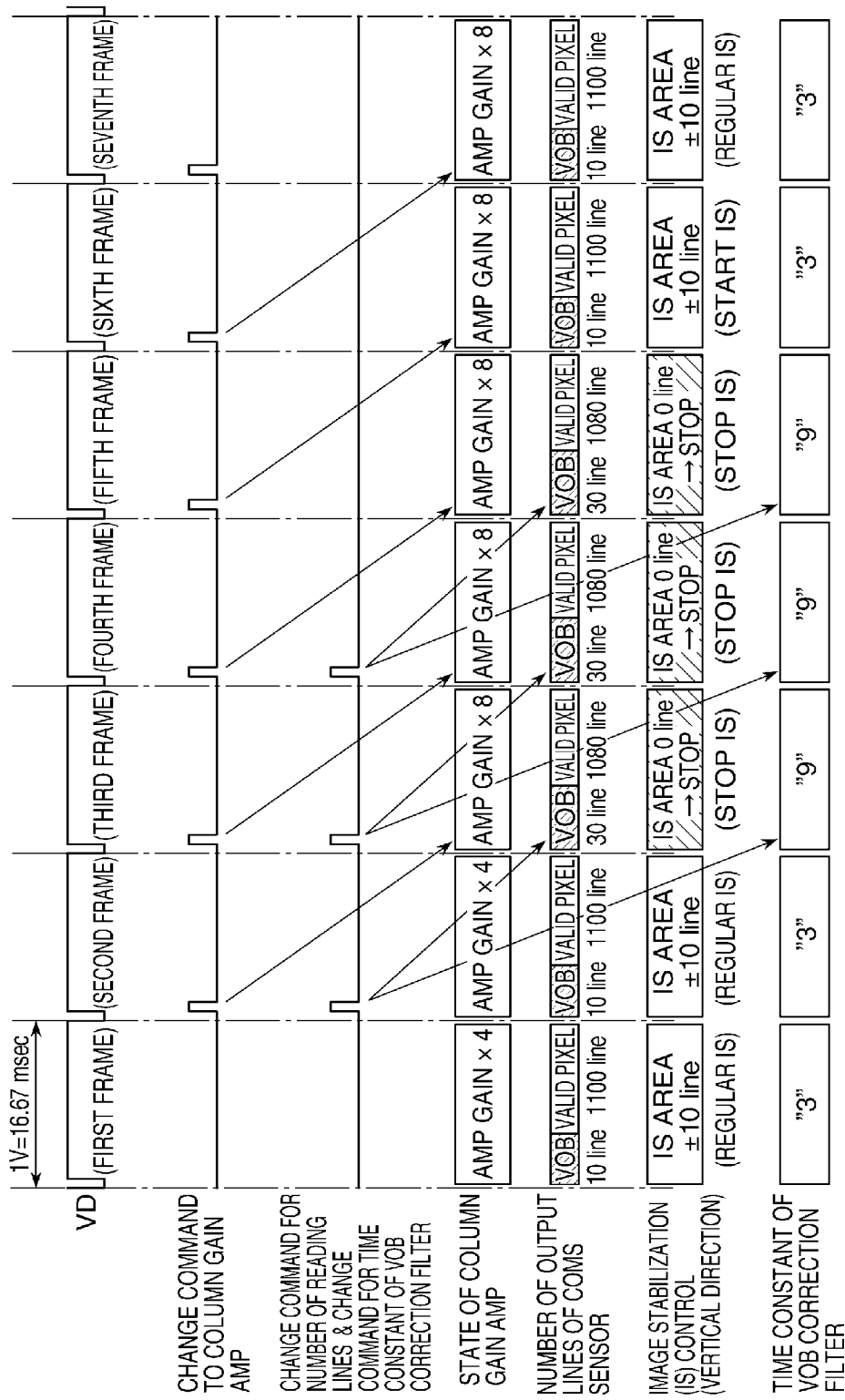
FIG. 6 is a view showing relation among a change of the number of reading lines, a change of an image stabilizable area, and the time constant setting of a correction filter in the camera shown in FIG. 1.

FIG. 6 is a view showing relation among a change of the number of reading lines, a change of the image stabilizable area, and the time constant setting of the correction filter in the camera shown in FIG. 1.

As shown in FIG. 6, the control gain value of the column gain AMP with which the CMOS sensor is provided is "×4" in the first frame, and the number of output lines of the CMOS sensor 3 is 10 lines in the VOB area and is 1100 lines in the valid pixel area. Here, since the video signal is a full HD format (1920H×1080V), the number of lines in the image stabilizable area in the vertical direction is ±10 lines. Moreover, the time constant of the correction filter for the VOB correction is "3".

In the second frame, when the control gain value of the AGC 5 shown in FIG. 1 exceeds the predetermined reference value (for example, 6 dB), the drive mode change module 109 sets a high level (H level) to the AMP control signal (a gain AMP change command). That is, the drive mode change module 109 changes a flag, which shows a command to set the control gain value of the column gain AMP at "×8", to "1" from "0".

As a result of this, the reading line control module 110 sets the reading control signal as the H level. That is, a flag that shows a change command for the number of reading lines and a change command for the time constant of the correction filter is changed to "1" from "0".

The changes of these flags change the control gain value of the column gain AMP to "×8" from "×4", change the number of the VOB lines, change the number of lines in the valid pixel area, and change the time constant of the correction filter, in the third frame.

In the third frame, the control gain value of the column gain AMP is set at "×4", and the number of output lines of the CMOS sensor 3 is 30 lines in the VOB area and is 1080 lines in the valid pixel area. Moreover, the number of lines in the image stabilizable area in the vertical direction will be 0 lines from ±10 lines.

That is, the image stabilization control in the vertical direction will be stopped in the third frame. Furthermore, the time constant of the correction filter is changed to "9" from "3" in order to perform high-speed pull-in operation.

It should be noted that duration of the high-speed pull-in operation, i.e., a period while the time constant of the correction filter is changed, is set beforehand. For example, the duration corresponds to three frames. As a result, the same operation as in the third frame is performed in the fourth frame and the fifth frame. It should be noted that the duration of the high-speed pull-in operation can be changed for every drive frame rate of the CMOS sensor 3.

Next, in the sixth frame, the operation is continued under the state where the control gain value of the column gain AMP is "×8". On the other hand, since the duration of the high-speed pull-in operation expires three frames as the predetermined duration, the time constant of the correction filter is changed to "3" from "9", and the regular pull-in operation is performed.

When the high-speed pull-in operation is finished, the number of reading lines of the CMOS sensor 3 is changed, and is restored to the regular state (10 lines in the VOB area and 1100 lines in the valid pixel area). Since the number of lines in the image stabilizable area in the vertical direction will be ±10 lines as a result, the image stabilization control in the vertical direction will restart from the sixth frame.

Figure 7:
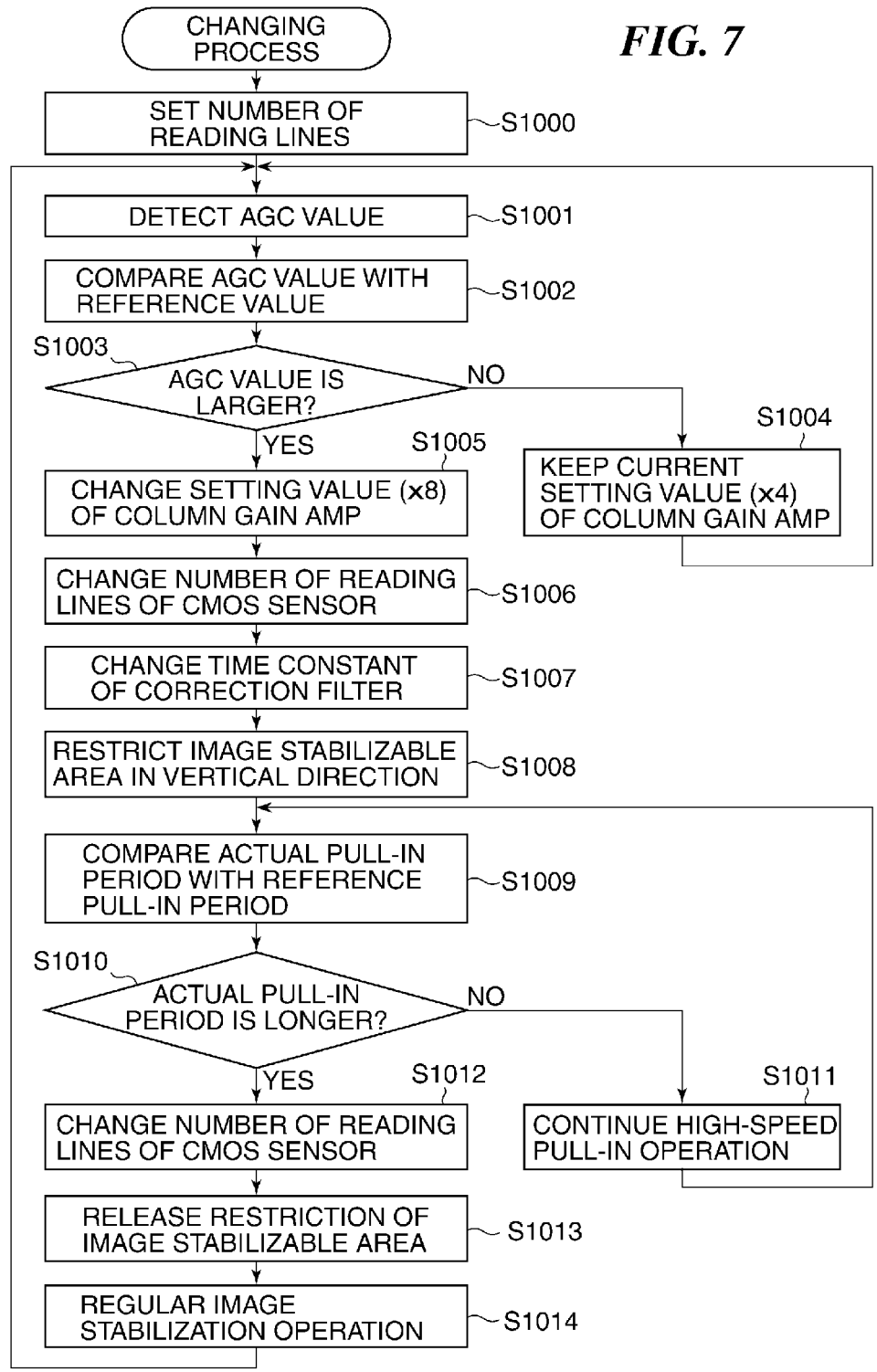
FIG. 7 is a flowchart showing a changing process executed by the camera shown in FIG. 1.

FIG. 7 is a flowchart showing a changing process executed by the camera shown in FIG. 1. It should be noted that the process of the flowchart in FIG. 7 is executed under the control by the CPU 8. Moreover, a changing process for the number of reading lines at the time of changing the control gain value of the column gain AMP with which the CMOS sensor 3 is provided, a changing process for the image stabilizable area, and a changing process for the time constant of the correction filter will be described hereafter.

When the power of the camera is turned ON, the CPU 8 sets the predetermined number of reading lines (step S1000). For example, the number of the VOB lines is 10 lines, the number of the valid lines is 1100 lines, and the total number is 1110 lines. Next, the CPU 8 detects the gain value of the AGC (referred to as an AGC value, hereafter) for making brightness of a subject into correct exposure according to the exposure control information obtained by the camera signal processing unit 6 (step S1001).

Next, the CPU 8 compares the AGC value with the reference value used for determining whether the control gain value of the gain AMP should be changed (step S1002). Then, the CPU 8 determines whether the AGC value exceeds the reference value (step S1003). When the AGC value is below the reference value (NO in the step S1003), the CPU 8 maintains the control gain value of the column gain AMP at the current control gain value (a first gain value). That is, the CPU 8 keeps the current gain AMP setting value "×4" (step S1004). Then, the CPU 18 returns the process to the step S1001.

On the other hand, when the AGC value exceeds the reference value (YES in the step S1003), the CPU 8 changes the control gain value of the column gain AMP to a control gain value (a second gain value) higher than the current control gain value. For example, the CPU 8 changes the control gain value of the column gain AMP to "×8" from "×4" (step S1005).

Next, the CPU 8 sets the number of reading lines of the CMOS sensor 3 to the changed number of reading lines from the above-mentioned predetermined number of reading lines (step S1006). The changed number of the VOB lines is 30 lines and the number of the valid pixel lines is 1080 lines, for example.

After changing the number of reading lines, the CPU 8 changes the time constant of the correction filter for subtracting VOB projection to a setting value (a second setting value or a second time constant: 9, for example) larger than the current setting value (a first setting value or a first time constant: 3, for example), and performs the high-speed pull-in operation of the correction filter (step S1007). Then, the CPU 8 changes the segmenting position for performing the electronic image stabilization according to the reduction of the number of valid pixel lines after changing the control gain value of the column gain AMP. That is, the CPU 8 restricts the image stabilizable area in the vertical direction (step S1008).

Next, the CPU 8 compares the number of passed frames (an actual pull-in period) to the current frame from the frame starting the high-speed pull-in operation with a reference number of frames (a reference pull-in period) showing a predetermined number of frames while executing the high-speed pull-in operation (step S1009). Then, the CPU 8 determines whether the number of passed frames exceeds the reference number of frames, i.e., whether the actual pull-in period is longer than the reference pull-in period (step S1010).

When the number of passed frames is below the reference number of frames (NO in the step S1010), the CPU 8 continues the high-speed pull-in operation while keeping the time constant of the correction filter at the second setting value (step S1011). Then, the CPU 8 returns the process to the step S1009.

On the other hand, when the number of passed frames exceeds the reference number of frames (YES in the step S1010), the CPU 8 completes the high-speed pull-in operation, changes the time constant of the correction filter to the first setting value (the first time constant) from the second setting value (the second time constant), changes the number of the VOB lines to 10 lines that is the regular number of lines, and changes the number of valid lines to 1100 lines (step S1012).

Since the number of reading lines is changed back to the regular number of lines in the valid pixel area, the CPU 8 releases the restriction of the image stabilizable area in the vertical direction (step S1013). Then, the CPU 8 performs the regular image stabilization operation (step S1014). Then, the CPU 8 returns the process to the step S1001.

In the first embodiment of the present invention, when the control gain value of the column gain AMP with which CMOS sensor 3 is provided is changed, the number of the VOB reading lines is increased in the changed frame as compared with the number of the VOB lines in the frame just before changing. Furthermore, the number of lines in the valid pixel area is decreased in the changed frame as compared with the number of lines in the valid pixel area in the frame just before changing, by the increased amount of the number of lines in the VOB area. Then, the image stabilizable area is restricted in the vertical direction from the frame in which the number of lines in the valid pixel area is decreased. In addition, the period during which the image stabilizable area is restricted is coincident with the period of the high-speed pull-in operation during which the time constant of the correction filter for the VOB projection subtracting correction is enlarged.

That is, in a first embodiment, when the drive mode of the CMOS sensor 3 is changed (for example, when the control gain value of the column gain AMP is changed), the number of the VOB lines is changed, the electronic image stabilizable area is restricted, and the period during which the image stabilizable area is restricted is controlled to be coincident with the period of the high-speed pull-in operation for the VOB projection subtracting correction. This prevents malfunction of the image stabilization function and reduces image quality deterioration due to a longitudinal line flaw and a black level deviation caused by change of the drive mode of the CMOS sensor 3.

Next, one example of a camera according to the second embodiment of the present invention will be described. Although the configuration of the camera in the second embodiment is similar to the configuration of the camera shown in FIG. 1, a part of the functions of the CPU 8 in the second embodiment is different from that in the first embodiment.

Figure 8:
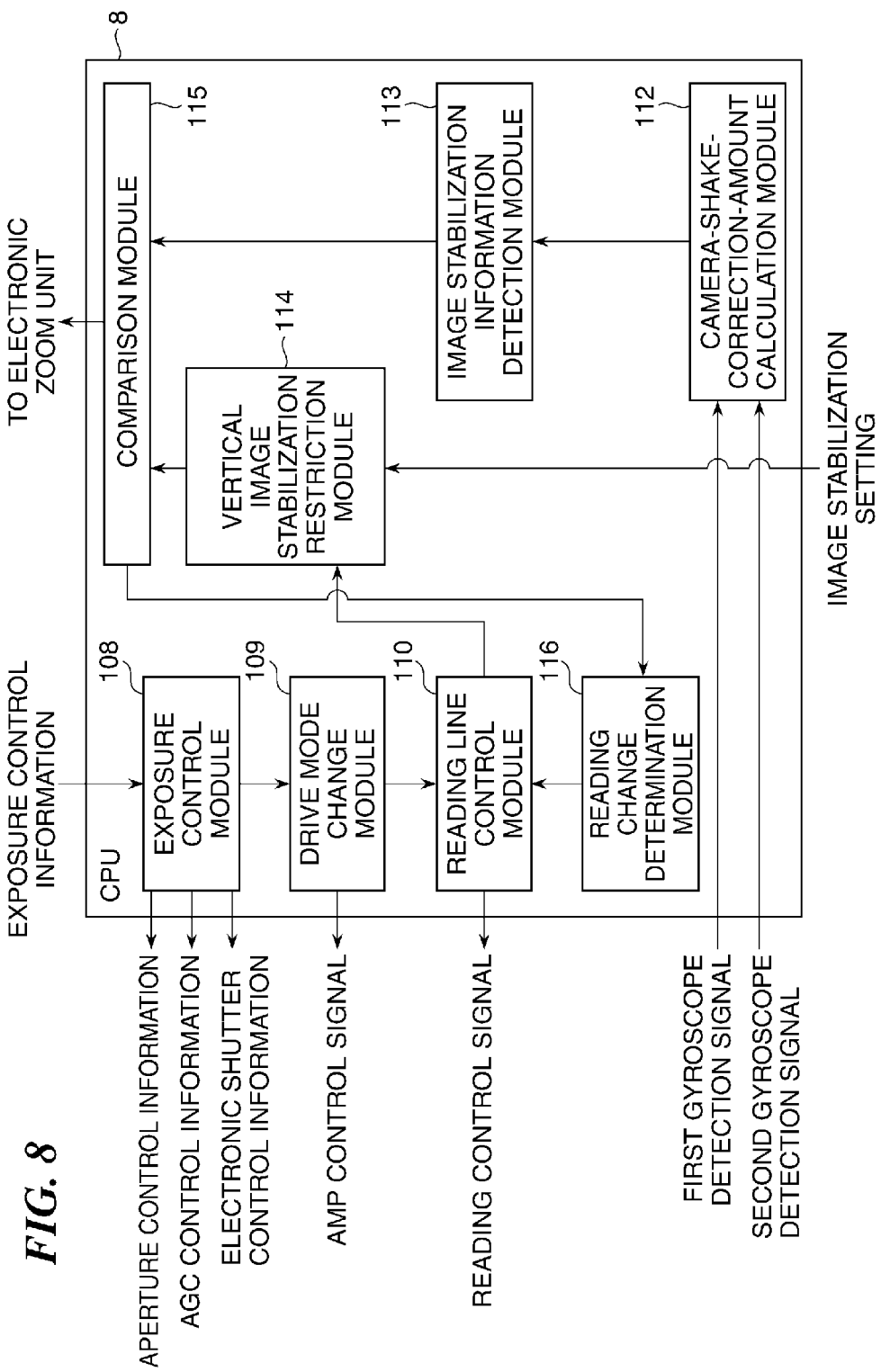
FIG. 8 is a block diagram schematically showing functions of a CPU in a camera according to a second embodiment of the present invention.

FIG. 8 is a block diagram schematically showing functions of the CPU in the camera according to the second embodiment of the present invention. It should be noted that the same reference numerals are attached to the same components in FIG. 3 and FIG. 8.

The CPU 8 shown in FIG. 8 has an image stabilization information detection module 113, a vertical image stabilization restriction module 114, a comparison module 115, and a reading change determination module 116 in addition to the functions of the CPU 8 shown in FIG. 3. Then, the CPU 8 determines whether the number of reading lines of the CMOS sensor 3 will be changed according to the camera shake correction amount under shooting.

As shown in FIG. 8, the reading line control module 110 outputs the above-mentioned reading line change information to the correction data generation unit 104 and the vertical image stabilization restriction module 114. When the image stabilization setting is set to ON with the image stabilization setting menu button 10, the vertical image stabilization control module 114 outputs image-stabilizable-area-restriction information for restricting the image stabilizable area in the vertical direction to the comparison module 115 according to the reading line change information (i.e., the number of lines in the valid pixel area changed).

The camera-shake-correction-amount calculation module 112 gives the camera shake correction information to the image stabilization information detection module 113. The image stabilization information detection module 113 decomposes the camera shake correction amount that the camera shake correction information shows in a vertical direction and a horizontal direction, and transmits a vertical camera shake correction amount as a camera shake correction component in the vertical direction and a horizontal camera shake correction amount as a camera shake correction component in the horizontal direction to the comparison module 115.

The comparison module 115 compares the vertical image stabilizable area value that the image stabilizable area restriction information shows with the vertical camera shake correction amount. Then, the comparing element 115 outputs a first determination signal that shows the H level ("1") to the reading change determination module 116, when the image stabilizable area value is below the vertical camera shake correction amount. Furthermore, the comparing element 115 outputs the vertical camera shake correction amount and the horizontal camera shake correction amount, i.e., the camera shake correction information, to the electronic zoom unit 7.

When receiving the first determination signal, the reading change determination module 116 determines to allow the change of the number of reading lines of the CMOS sensor 3 (OK), and transmits a reading change permission signal to the reading line control module 110. Then, when receiving the reading change permission signal, the reading line control module 110 outputs a reading control signal for changing the number of reading lines of the CMOS sensor 3 to the CMOS sensor 3.

On the other hand, when the image stabilizable area value exceeds the vertical camera shake correction amount, the comparison module 115 outputs a second determination signal that shows the L level ("0") to the reading change determination module 116. Furthermore, the comparison module 115 outputs the vertical camera shake correction amount and the horizontal camera shake correction amount, i.e., the camera shake correction information, to the electronic zoom unit 7.

When receiving the second determination signal, the reading change determination module 116 determines not to allow the change of the number of reading lines of the CMOS sensor 3 (NG), and transmits a reading change non-permission signal to the reading line control module 110. Then, when receiving the reading change non-permission signal, the reading line control module 110 outputs a reading control signal to the CMOS sensor 3 without changing the number of lines of the CMOS sensor 3.

Figure 9A:
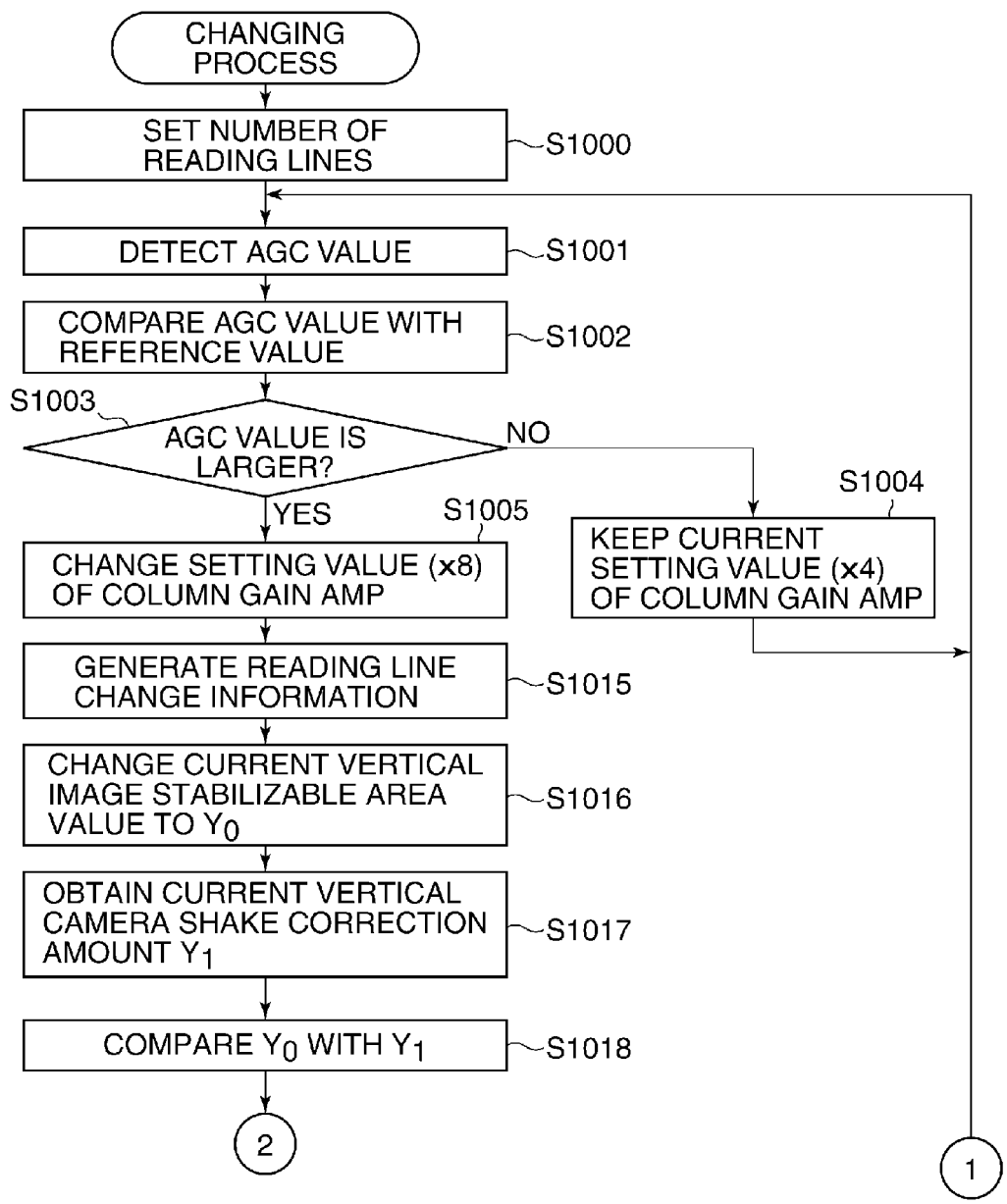
FIG. 9A is a flowchart showing a part of a changing process executed by the camera according to the second embodiment of the present invention.
Figure 9B:
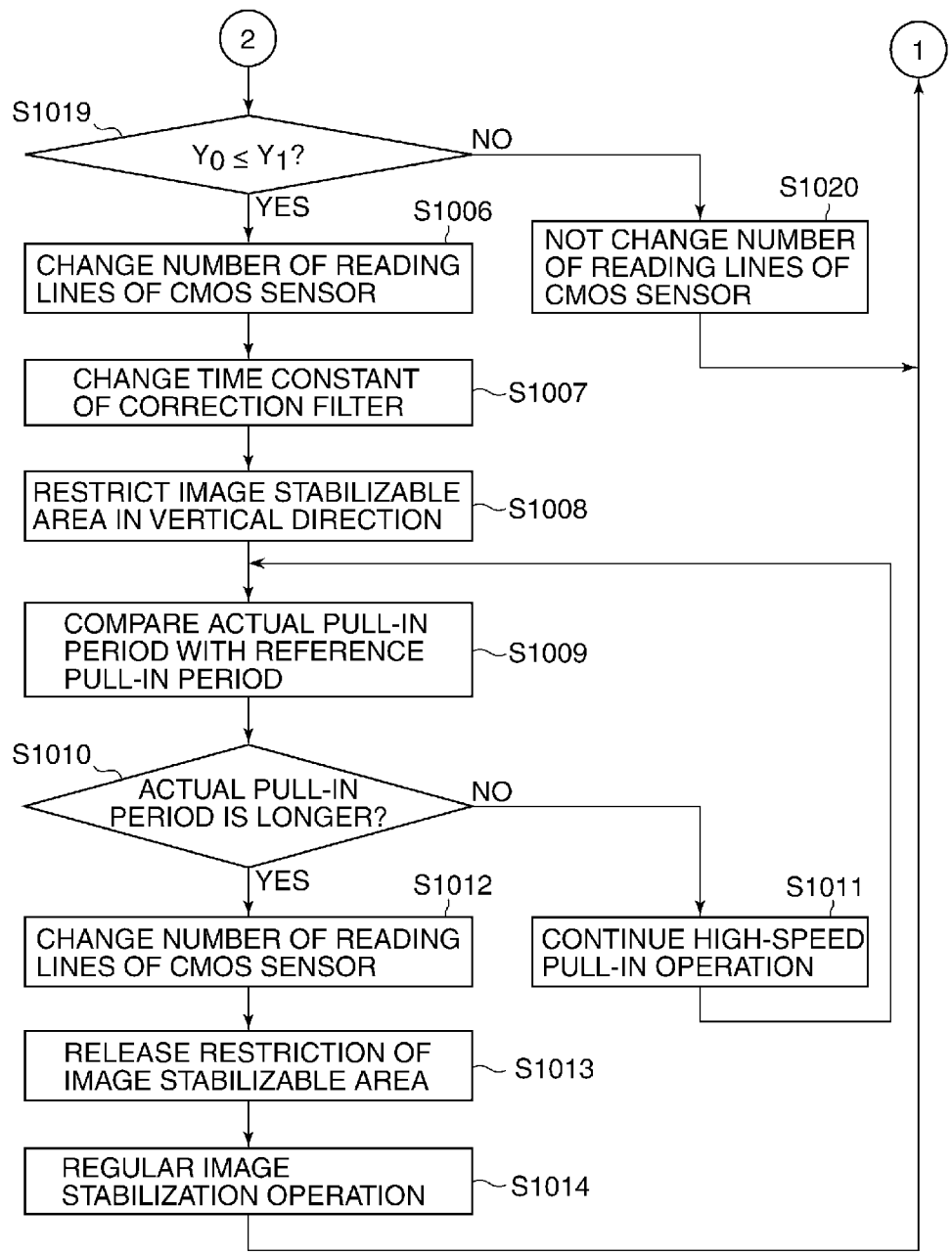
FIG. 9B is a flowchart showing the remaining part of the changing process executed by the camera according to the second embodiment of the present invention.

FIG. 9A and FIG. 9B are flowcharts showing a changing process executed by the camera according to the second embodiment of the present invention.

It should be noted that the process of the flowcharts in FIG. 9A and FIG. 9B is executed under the control by the CPU 8 shown in FIG. 8. Moreover, in the illustrated flowcharts, the same steps as the steps in FIG. 7 are indicated by the same step numerals, and their descriptions are omitted.

Following the process in the step S1005 described in FIG. 7, the CPU 8 generates the reading line change information (step S1015), and changes the current vertical image stabilizable area value Y to a new vertical image stabilizable area value $Y_0$ according to the reading line change information concerned (step S1016).

Next, the CPU 8 obtains the current vertical camera shake correction amount $Y_1$ according to the camera shake correction information as mentioned above (step S1017). Then, the CPU 8 compares the vertical camera shake correction amount $Y_1$ with the new vertical image stabilizable area value $Y_0$ (step S1018).

When the new vertical image stabilizable area value $Y_0$ is below the vertical camera shake correction amount $Y_1$ (YES in the step S1018), the CPU 8 performs the process in the steps S1006 through S014 that are described in FIG. 7. On the other hand, when the new vertical image stabilizable area value $Y_0$ exceeds the vertical camera shake correction amount $Y_1$ (NO in the step S1018), the CPU 8 returns the process to the step S1001 without changing the currently setting number of reading lines of the CMOS sensor 3 (step S1020).

As mentioned above, in the second embodiment of the present invention, the current camera shake correction amount (i.e., the image stabilization amount) is compared with the image stabilization restriction information according to the change of the number of reading lines, and it is determined whether the number of reading lines is changed according to the comparison result concerned. This reduces blur caused by a field angle deviation of an image that occurs when the current image stabilization amount exceeds the image stabilization restriction information.

The above-mentioned description makes it clear that the CPU 8, the A/D converter 4, and the AGC 5 function as the gain adjustment unit, and that the CPU 8 and the camera signal processing unit 6 function as the image processing unit, in the example shown in FIG. 1. Moreover, the CPU 8 functions as the reading control unit and the changing unit.

Then, the gyroscope unit 7 functions as the detection unit, and the CPU 8 functions as the calculation unit.

Although the embodiments of the invention have been described, the present invention is not limited to the above-mentioned embodiments, the present invention includes various modifications as long as the concept of the invention is not deviated.

For example, the functions of the above mentioned embodiments may be achieved as a control method that is executed by an image pickup apparatus. Moreover, the functions of the above mentioned embodiments may be achieved as a control program that is executed by a computer with which the image pickup apparatus is provided. It should be noted that the control program is recorded into a computer-readable storage medium, for example.

Each of the above-mentioned control method and control program has a reading control step and a changing step at least.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-272387, filed Dec. 27, 2013, which is hereby incorporated by reference herein in its entirety.

What is claimed is:

1. An image pickup apparatus comprising:
an image pickup device comprising a pixel area, the pixel area including a valid pixel area and a reference pixel area, the valid pixel area obtaining an image signal, and the reference pixel area obtaining information for a reference level correction, and the image pickup device further comprising an amplifier that amplifies an output from the pixel area, the image pickup device outputting the image signal corresponding to an optical image formed in the valid pixel area; and
a controller that changes numbers of reading lines assigned to the valid pixel area and the reference pixel area in the pixel area in a case where a gain of the amplifier is changed,
wherein said controller decreases a number of reading lines assigned to the valid pixel area and increases a number of reading lines assigned to the reference pixel area in a case where the gain of the amplifier is increased.

2. The image pickup apparatus according to claim 1, wherein said controller changes a time constant of a correction filter that is used in the reference level correction in a case where the gain of the amplifier is changed.

3. The image pickup apparatus according to claim 2, wherein said controller releases changes of numbers of reading lines assigned to the valid pixel area and the reference pixel area of the pixel area in a case where a pull-in period to a current frame from a frame in which the time constant of the correction filter is changed exceeds a specified reference pull-in period.

4. The image pickup apparatus according to claim 2, wherein said controller makes a period during which numbers of reading lines assigned to the valid pixel area and the reference pixel area are changed be coincident with a period during which the time constant of the correction filter is changed.

5. An image pickup apparatus according to claim 1, wherein the reference pixel area includes an optical black pixel area.

6. An image pickup apparatus comprising:
an image pickup device comprising a pixel area, the pixel area including a valid pixel area and a reference pixel area, the valid pixel area obtaining an image signal, and the reference pixel area obtaining information for a reference level correction, and the image pickup device further comprising an amplifier that amplifies an output from the pixel area, the image pickup device outputting the image signal corresponding to an optical image formed in the valid pixel area; and
a controller that changes numbers of reading lines assigned to the valid pixel area and the reference pixel area in the pixel area in a case where a gain of the amplifier is changed,
wherein said controller changes an image stabilization area used for an image stabilization control of the image pickup apparatus in the valid pixel area in a case where a number of reading lines assigned to the valid pixel area is changed.

7. The image pickup apparatus according to claim 6, wherein said controller changes the image stabilization area in a case where the image stabilization control turns ON.

8. The image pickup apparatus according to claim 6, wherein said controller restricts the image stabilization area in a case where a number of reading lines assigned to the valid pixel area is changed.

9. An image pickup apparatus according to claim 6, wherein the reference pixel area includes an optical black pixel area.

10. An image pickup apparatus comprising:
an image pickup device comprising a pixel area, the pixel area including a valid pixel area and a reference pixel area, the valid pixel area obtaining an image signal, and the reference pixel area obtaining information for a reference level correction, and the image pickup device further comprising an amplifier that amplifies an output from the pixel area, the image pickup device outputting the image signal corresponding to an optical image formed in the valid pixel area;

a controller that changes numbers of reading lines assigned to the valid pixel area and the reference pixel area in the pixel area in a case where a gain of the amplifier is changed;

a detector that detects a shake in the image pickup apparatus and obtains a shake amount; and a calculator that calculates a shake correction amount used for image stabilization control according to the shake amount, wherein said controller changes numbers of reading lines assigned to the valid pixel area and the reference pixel area in a case where a value showing restriction of an image stabilization area is below the shake correction amount.

11. An image pickup apparatus according to claim 10, wherein the reference pixel area includes an optical black pixel area.

12. A control method for an image pickup apparatus including an image pickup device, the image pickup device including a pixel area, the pixel area including a valid pixel area and a reference pixel area, the valid pixel area obtaining an image signal, and the reference pixel area obtaining information for a reference level correction, and the image pickup device further comprising an amplifier that amplifies an output from the pixel area, the image pickup device outputting the image signal corresponding to an optical image formed in the valid pixel area, the control method comprising:

a control step of a controller of the image pickup apparatus changing numbers of reading lines assigned to the valid pixel area and the reference pixel area in the pixel area in a case where a gain of the amplifier is changed, wherein the control step includes said controller decreasing a number of reading lines assigned to the valid pixel area and increasing a number of reading lines assigned to the reference pixel area in a case where the gain of the amplifier is increased.

13. A non-transitory computer-readable storage medium storing a control program causing a computer to execute a control method for an image pickup apparatus including an image pickup device, the image pickup device including a pixel area, the pixel area including a valid pixel area and a reference pixel area, the valid pixel area obtaining an image signal, and the reference pixel area obtaining information for a reference level correction, and the image pickup device further comprising an amplifier that amplifies an output from the pixel area, the image pickup device outputting the image signal corresponding to an optical image formed in the valid pixel area, the control method comprising:

a control step of a controller of the image pickup apparatus changing numbers of reading lines assigned to the valid pixel area and the reference pixel area in the pixel area in a case where a gain of the amplifier is changed, wherein the control step includes said controller decreasing a number of reading lines assigned to the valid pixel area and increasing a number of reading lines assigned to the reference pixel area in a case where the gain of the amplifier is increased.

14. A control method for an image pickup apparatus including an image pickup device, the image pickup device including a pixel area, the pixel area including a valid pixel area and a reference pixel area, the valid pixel area obtaining an image signal, and the reference pixel area obtaining information for a reference level correction, and the image pickup device further comprising an amplifier that amplifies an output from the pixel area, the image pickup device outputting the image signal corresponding to an optical image formed in the valid pixel area, the control method comprising:

a first control step of a controller of the image pickup apparatus changing numbers of reading lines assigned to the valid pixel area and the reference pixel area in the pixel area in a case where a gain of the amplifier is changed; and a second control step of said controller changing an image stabilization area used for an image stabilization control of the image pickup apparatus in the valid pixel area in a case where a number of reading lines assigned to the valid pixel area is changed.

15. A non-transitory computer-readable storage medium storing a control program causing a computer to execute a control method for an image pickup apparatus including an image pickup device, the image pickup device including a pixel area, the pixel area including a valid pixel area and a reference pixel area, the valid pixel area obtaining an image signal, and the reference pixel area obtaining information for a reference level correction, and the image pickup device further comprising an amplifier that amplifies an output from the pixel area, the image pickup device outputting the image signal corresponding to an optical image formed in the valid pixel area, the control method comprising:

a first control step of a controller of the image pickup apparatus changing numbers of reading lines assigned to the valid pixel area and the reference pixel area in the pixel area in a case where a gain of the amplifier is changed; and a second control step of said controller changing an image stabilization area used for an image stabilization control of the image pickup apparatus in the valid pixel area in a case where a number of reading lines assigned to the valid pixel area is changed.

16. A control method for an image pickup apparatus including an image pickup device, the image pickup device including a pixel area, the pixel area including a valid pixel area and a reference pixel area, the valid pixel area obtaining an image signal, and the reference pixel area obtaining information for a reference level correction, and the image pickup device further comprising an amplifier that amplifies an output from the pixel area, the image pickup device outputting the image signal corresponding to an optical image formed in the valid pixel area, the control method comprising:

a first control step of a controller of the image pickup apparatus changing numbers of reading lines assigned to the valid pixel area and the reference pixel area in the pixel area in a case where a gain of the amplifier is changed;

a detection step of a detector of the image pickup apparatus detecting a shake in the image pickup apparatus and obtaining a shake amount;

a calculation step of a calculator of the image pickup apparatus calculating a shake correction amount used for image stabilization control according to the shake amount; and a second control step of said controller changing numbers of reading lines assigned to the valid pixel area and the reference pixel area in a case where a value showing restriction of an image stabilization area is below the shake correction amount.

17. A non-transitory computer-readable storage medium storing a control program causing a computer to execute a control method for an image pickup apparatus including an image pickup device, the image pickup device including a pixel area, the pixel area including a valid pixel area and a reference pixel area, the valid pixel area obtaining an image signal, and the reference pixel area obtaining information for a reference level correction, and the image pickup device further comprising an amplifier that amplifies an output from the pixel area, the image pickup device outputting the image signal corresponding to an optical image formed in the valid pixel area, the control method comprising:

- a first control step of a controller of the image pickup apparatus changing numbers of reading lines assigned to the valid pixel area and the reference pixel area in the pixel area in a case where a gain of the amplifier is changed;
- a detection step of a detector of the image pickup apparatus detecting a shake in the image pickup apparatus and obtaining a shake amount;
- a calculation step of a calculator of the image pickup apparatus calculating a shake correction amount used for image stabilization control according to the shake amount; and
- a second control step of said controller changing numbers of reading lines assigned to the valid pixel area and the reference pixel area in a case where a value showing restriction of an image stabilization area is below the shake correction amount.

* * * * *